United States Patent [19]

Kiefer et al.

[11] Patent Number: 5,801,051
[45] Date of Patent: Sep. 1, 1998

[54] METHOD AND APPARATUS FOR CLEANING A FILTER AID

[75] Inventors: Johannes Kiefer, Abtwil; Manfred Girr, St. Gallen; Aukens Jan Smaal, Rorschach; Brigitte Lippuner, St. Gallen, all of Switzerland

[73] Assignee: Filtrox-Werk AG, Gallen, Switzerland

[21] Appl. No.: 547,523

[22] Filed: Oct. 24, 1995

Related U.S. Application Data

[63] Continuation-in-part of Ser. No. 194,275, Feb. 10, 1994, abandoned.

[51] Int. Cl.$^6$ ............................................. C02F 1/00
[52] U.S. Cl. .................. 435/262; 435/264; 210/632; 502/412
[58] Field of Search ........................... 435/262, 264, 435/288, 814; 210/321.69, 503, 632, 636; 502/412, 415

[56] References Cited

U.S. PATENT DOCUMENTS 3,362,533  1/1968  Muller ........................... 210/75
5,277,819  1/1994  Abrams ......................... 210/636

FOREIGN PATENT DOCUMENTS

| 0253233 | 1/1988 | European Pat. Off. . |
| 0255696 | 2/1988 | European Pat. Off. . |
| 0255696 | 10/1988 | European Pat. Off. . |
| 291702 | 7/1991 | Germany . |
| 61-78403 | 4/1986 | Japan . |
| 9408693 | 4/1994 | WIPO . |

*Primary Examiner*—Ralph Gitomer
*Attorney, Agent, or Firm*—Shoemaker and Mattare, Ltd

[57] ABSTRACT

A method for removing organic contaminants including yeast cells from a particulate filter aid such as kieselguhr includes steps of producing an aqueous suspension of the contaminated filter aid, and adding to the suspension a mixture of enzymes (protease, amylase and glucanase) capable of dissolving yeast cell walls. Optionally, an oxidizer may also be added, and the suspension may be agitated ultrasonically. After sufficient time, the enzyme and dissolved organic contaminant are removed from the suspension by rinsing with dilute caustic soda, and the decontaminated filter aid is acid neutralized. Finally, the filter aid may be separated into coarse and fine fractions, and re-used.

7 Claims, 1 Drawing Sheet

1

METHOD AND APPARATUS FOR CLEANING A FILTER AID

This is a continuation-in-part of application Ser. No. 08/194,275, filed Feb. 10, 1994, now abandoned.

BACKGROUND OF THE INVENTION

This invention relates to the art of filtration and more particularly to a method and apparatus for cleaning a caking filter aid.

During manufacture of many beverages, including beer and wine, the product must be clarified as one of the final process stages. Clarification can be achieved by a number of techniques including centrifuging, sedimentation, flotation and filtration. Often, several such techniques are performed in sequence in order to obtain optimal clarification, particularly in the case of fermented beverages or fruit juices.

Filtration is the most commonly applied method of clarification, since it can be optimized for a particulars product. Suitable filtration methods may employ cake filters, pressure or vacuum filters, filters using filter aids such as inorganic particles, deep bed filters, or surface filters such as membranes.

A commonly used filtration method, mainly for the manufacture of fruit juices and alcoholic beverages, employs kieselguhr (diatomaceous earth) as a precoating material. Typically, a first layer of coarse kieselguhr having a permeability of 600–1000 mDarcy is applied to a support material such as cellulose, wire mesh, or a split tube sieve. The coarse layer serves to bridge the gaps in the support material and acts as a support for the next coat of finer kieselguhr. During the filtration process, kieselguhr is fed constantly from a metered supply to the filter. The process can be controlled by altering the type and amount of the kieselguhr, in accordance with the cloudiness of the filtrate. During this process, a filter cake is produced, comprising a mixture of the kieselguhr fed from the metered supply and contaminants extract from the product. Eventually, the mixture can no longer be used for filtration purposes, and, according to present techniques, is disposed of as waste. It may dumped as garbage, used to prepare compost, or spread on farmland. These disposal possibilities are useful to a limited degree; however, there are certain drawbacks. For example, if the material is required to be disposed of in a compact condition, water must be removed, as by pressing, until the material has a water content of about 35%. Water removal costs must therefore be added to the dumping costs. Similar problems occur with other methods of filtration.

For some time, an attempt has been made to separate the filter aid from the built-up contaminating material, by means of cleansing or regeneration. Numerous methods have been suggested. Finis and Galaske (Brauwelt, No. 49, 1988, page 2332) describe the thermal cleaning of kieselguhr sludge from brewery operations. Initially, the sludge is agitated in a mixing and equalizing tank. Then water is mechanically removed from the mixture, leaving a water content of 50%–55% by weight. Then the sludge, comprising mostly yeast and proteins deposited on the kieselguhr, is incinerated by heating the kieselguhr to 700°–800 ° C. As a final step, the remaining material is classified to obtain a predetermined permeability range. The disadvantages of this method are as follows:

(a) a high level of energy expenditure is required by the drying and incineration process;

(b) various type of kieselguhr become mixed;

(c) recycling efficiency is poor, since only 50% of the kieselguhr obtained from breweries can be returned to them for re-use, and (d) there are costs associated with transporting the material to and from a centralized processing facility.

It may be noted that permeability is the most important characteristic of Kieselguhr, so a good cleansing process ought to minimize reduction of the kieselguhr's permeability. Heating at high temperature is known to be deleterious in this regards.

Alternatively, a decentralized method of processing, operated locally by the user of the filter aid, is described by Sommer (Brauwelt, No. 5, 1990, S. 151, and European Patent 0 253 233 B1). In this system, kieselguhr sludge is treated with caustic soda at temperatures of 80°–85° C., and then the caustic soda is rinsed out with water and diluted sulfuric acid on a band filter. Other disadvantages of this method are:

(a) there is high consumption of both caustic soda and acid, with corresponding contamination of waste water, (b) the investment costs of the mechanically complex plant are high, (c) there is a lasting, organic, residual contamination of the reclaimed material of about 2%–5% (measured by weight is loss during incineration), and (d) the low rate of recycling (only about 70%).

A further method for regenerating filter mediums is described in patent document D 291 702 A5. Here, filter layers are wet crushed and the contaminant is dissolved in caustic soda having a concentration of 0.2 to 2.0 percent. Just one further use in precoated filtration is contemplated for the reprocessed material, and therefore this is not a true cyclic process.

European Patent 0 255 696 S2 is also based on the regeneration of filter aid—in this case $Al_2O_3$—in hot caustic soda. A caustic soda concentration of between 5% and 10% is used.

SUMMARY OF THE INVENTION

The present invention aims to avoid the above-noted disadvantages of known processes, and in particular to enable local regeneration of cleansing of the filter aid, on the user's site, with economical and ecologically interesting supplementary results.

According to the invention, a contaminated filter aid is subjected to treatment with warm water with the addition of a combination of enzymes chosen for their ability to attach high molecular weight organic contaminants and to convert them into low molecular weight, soluble forms. The preferred enzymes are mainly proteolytic, glucolytic, amylolytic or pectolytic enzymes, or mixtures of the same such as the products AMG, Ceremix or Ceroflo, manufactured by Novo Nordisk, Bagsvaerd, Denmark. Beta-glucanase is also suitable for use in this invention, as are enzymes which attach the cell walls of microorganisms, such as an enzyme sold under the designation SP 299, also manufactured by Novo Nordisk.

The enzyme-treated sludge, containing the filter aid, is subsequently separated from the cleansing solution via a suitable system of solids-liquid separation, and is fed to a washing process involving water, preferably hot water. This washing process can be carried out inside or outside the separation device. Additional cleansing steps may be employed to further reduce the organic load, for example, the use of a solution of NaOH having a maximum weight concentration of 0.5%, or the addition of an oxidizing agent such as hydrogen peroxide or ozone. The kieselguhr sludge can be reused for beverage filtration at the end of this treatment. The invention is particularly suitable where kieselguhr is the filter aid, since kieselguhr is not destroyed either by the oxidizing agent or by the caustic soda. But the invention can also be employed with other filter aids, in particular inorganic filter aids such as glass particles, silica gel, alpha-aluminum oxide and so on.

When using glass particles as a filter aid and cleansing with caustic soda, care must be taken that when using porous glass with a low pH resistance, only a very weak caustic soda be employed, or that caustic soda cleansing be dispensed with altogether. The same applies for perlite. In the case of silica gel, caustic soda cleansing is normally avoided.

Cellulose fibers or synthetic fibers can also be used. With alpha-cellulose as fibrillated fibers, caustic soda may be used only at low concentrations. The use of cellulose fibers is chiefly recommended in mixtures with other filter aids. In the case of synthetic fibers, fibrillated polyethylene (PE) and polypropylene (PP) fibers can be used. Fiber types E400 and E620 (PE) of Y600 (PP) are suitable, for example. It is relatively simple for the experienced person in the art to decide which of these fibers can be used and how to control or select additional cleansing steps (oxidizing agent, caustic soda, etc.), considering the particular filter aid chosen.

With this invention, one may subject the kieselguhr to ultrasonic waves during one of the cleansing steps. As is known from the literature, extraction procedures are assisted in their effect by using ultrasonics (Render, M.; Luhede, J.; Haase, B.; Chemie-Ingenieur-Technik, 64(1992) No. 5 S. 464–465). The efficiency of cleansing is increased by ultrasonics particularly when the contamination is firmly adhered. With cleansing carried out this way, up to 80% of the adhering organic contaminants, chiefly yeast and protein, can be removed from the kieselguhr, so that an incineration loss of less the 2% by weight can be aimed at. This residual contamination level is not critical with regard to hygiene or to the filtration process.

The possibility exists of submitting the cleansed kieselguhr (or other cleansed filter aids such as perlite of glass particles) to fractionation into coarse and finer particles, in order to adapt the regenerated material, which because of the method is composed out of necessity of various particle sizes, to the above-described requirements of the special mixture during filtration. This fractionation can be obtained by using hydrocyclones, for example as described in DE-AS-1,063,131. Various possible sequences appear in the examples below.

A further advantage of the invention is that the handling of dry, heavily dust-forming kieselguhr, is minimized. The kieselguhr, except for fresh material used to replace small losses, remains primarily in liquid suspensions. Laborious dust protection measures, which are absolutely necessary in normal operations involving 100% fresh kieselguhr, can be considerably reduced or eliminated altogether.

DESCRIPTION OF THE PREFERRED EMBODIMENT

Figure 1:
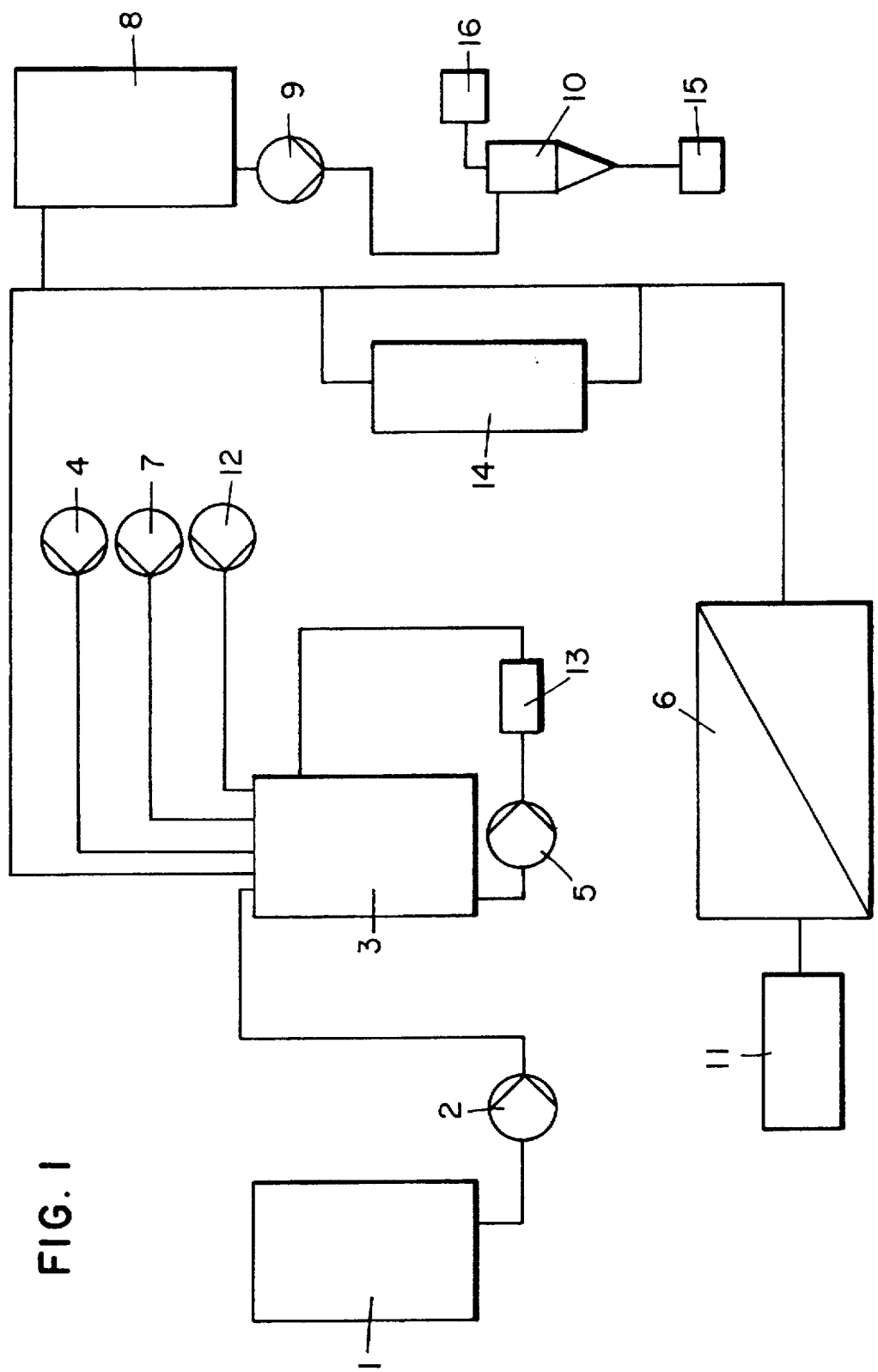
FIG. 1 is a diagram of an apparatus for practicing the invention.-In the claims.

A process embodying the invention is described in each of the following examples, each referring to FIG. 1.

EXAMPLE 1

Kieselguhr sludge discharged from a beer making filter was stored in an intermediate tank 1, where it was kept in a homogeneous condition by means of an agitator. The sludge, containing kieselguhr and organic contaminants including yeast of the type "Saccharomyces", was fed by means of a pump 2 to a reaction tank 3. Here, undiluted enzyme mixture sold by Novo Nordisk under the trademark Ceremix (containing a protease, an amylase and a beta-glucanase), was added to the tank in a volume equal to 0.1% of the sludge volume by means of a metering pump 4, at a pH value of 5.4 to 5.6 and a temperature of 45° C.

After a reaction time of two hours, the reaction was interrupted by adding caustic soda (NaOH) via a second metering pump 7. The suspension was then heated to 80° C. and kept at this temperature for one hour. The suspension was moved from the tank 3, by means of a pump 5, to a solids separating device 6, in which a filter cake formed. The filter cake extracted was returned to the reaction tank 3, then rinsed with clean water and then neutralized through the addition of a weak acid (0.5% to 2.0% phosphoric acid) by means of a third metering pump 12; a final water rinse at 80° C. followed. After completion of this treatment step, the sludge was fed once again into the solids separation device, and the filter cake thus formed was finally transferred to a storage tank 8.

A sample of the filter cake was dried by heating, and then analyzed for weight loss and permeability.

EXAMPLE 2

Kieselguhr sludge was stored, agitated, and transferred to a reaction tank, under the same conditions as in Example 1. The enzyme treatment was skipped entirely, however, and caustic soda was added immediately. The suspension was then heated to 80° C., and kept at that temperature for one hour, as in Example 1. Following steps of rinsing, neutralizing, and rinsing, as in Example I, the sludge was fed once again into the solids separation device. The filter cake thus formed was dried and analyzed. Table I shows the results of the processes of Examples 1 and 2.

TABLE I

|  | Example 1 | Example 2 |
|---|---|---|
| Initial analysis: Permeability of raw kieselguhr (mDarcy) | 75.2 | 75.2 |
| Treatment: | Ceremix; NaOH | NaOH only |
| Final analysis: |  |  |
| Permeability of kieselguhr (mDarcy) | 69.7 | 18.0 |
| Kieselguhr weight loss % | 0.8% | 2.4% |

EXAMPLE 3

Sludge from a beer making filter was stored, agitated, and treated with the enzyme mixture Ceremix, as in Example I. The filter cake extracted was returned to the reaction tank 3 and from there is fed to an ultrasonic treatment device 13 simultaneous with the addition of NaOH by a second metering pump 7. The contaminated run-off water was fed to a water processing plant 11, which is not shown in detail.

The suspension was then neutralized and separated as in the Example I.

EXAMPLE 4

Kieselguhr sludge was treated with enzyme in accordance with Examples 1 and 3. Upon transfer to the bigger tank, the cleansed kieselguhr was additionally subjected to heating at temperatures of 70° to 90° C. for 15 to 45 minutes by means of a heat exchanger 14. (At least 50 to 500 pasteurization units should be attained in order to kill off beverage-damaging micro-organisms.)

EXAMPLE 5

Kieselguhr sludge was treated in accordance with examples 1 and 3, except that in place of the Ceremix, enzyme SP 299 from Novo Nordisk was added by means of the metering pump 4 in order to dissolve the yeast cell walls. On completion of a 30 minute to 10 hour duration enzyme treatment at the optimum effectiveness of the enzyme, a second metering pump delivered caustic soda additive at a concentration of 0.3 to 1.5 weight percent. From this tank, the sludge was fed to a solids separation device 6 by means of a pump 5. The filter aid which was extracted was then transferred to the storage tank 8, and heat treated as in Example 4.

In the inventive process as exemplified above, the cleaned kieselguhr can subsequently be separated into a coarse fraction 15 and a finer fraction 16, by feeding it from the storage tank 8 via the pump 9 to at least one hydrocyclone. The contaminated run-off water is discharged to a water processing plant 11, not shown in detail here.

All process steps for the regeneration were performed on an aqueous dispersion of the filter aid, e.g., kieselguhr in water. The solids content amounted to 10% by weight of the water.

The organic components to be separated can be considered partly as undissolved, and partly as colloidally dissolved. Consequently, the volume of accompanying water fed for the separation of contaminants from water is of considerable significance. The process must be controlled in such a way that replacement of contaminated water with clean water is possible. In this way, the organic loading of the kieselguhr can be considerably reduced.

Since the pumpability of the sludge is important, the regeneration is performed at a dry substance proportion of less than 30% by weight. Preferably, in order to facilitate later filtration processes, the dry substance content of the sludge should be in the range of 10% to 20% by weight. But even lower solids concentrations are possible during the process; in that case, other types of filters can be considered, including vacuum filters, pressure filters, band filter, rotary drum filters, leaf and candle filters. Hydrocyclones, centrifuges, membrane filters, cross-flow filters or sedimentation tanks may also be employed.

While the invention has been described particularly as applied to beer making, it should be understood that the principles of the invention are applicable to filtration of any fruit or grain beverage.

Inasmuch as the invention is subject to modifications and variations, the foregoing description and accompanying drawings should not be regarded as limiting the invention defined by the following claims and various subcombinations thereof.

We claim:

1. A method for recycling a particulate filter aid comprising kieselguhr which has become contaminated with organic matter including yeast cells, said method comprising steps of producing an aqueous suspension of the filter aid, adding to the aqueous suspension an agent including at least one enzyme which destroys yeast cell walls, and waiting a sufficient time for the yeast cell walls to be destroyed, then removing the particulate filter aid from the suspension, and then reusing the filter aid in a filter.

2. The method of claim 1, wherein the at least one enzyme comprises a protease, an amylase and a glucanase.

3. The method of claim 2, wherein the suspension is maintained at an acidic pH at about 45° C., for about two hours, then neutralized by adding caustic soda.

4. The method of claim 3, comprising a further step of adding an oxidizing agent to the suspension after said neutralizing step.

5. The method of claim 4, wherein the oxidizing agent is hydrogen peroxide.

6. The method of claim 4, wherein the oxidizing agent is ozone.

7. The method of claim 4, wherein the oxidizing step is accompanied by a step of ultrasonic agitation.

* * * * *